US012458529B2

(12) United States Patent
Burgess

(10) Patent No.: US 12,458,529 B2
(45) Date of Patent: Nov. 4, 2025

(54) METHOD AND APPARATUSES FOR MANIPULATING AN ENDOCRINE BODY-TEMPERATURE SET-POINT IN HUMANS AND WARM-BLOODED ANIMALS

(71) Applicant: James Burgess, Missouri City, TX (US)

(72) Inventor: James Burgess, Missouri City, TX (US)

(*) Notice: Subject to any disclaimer, the term of this patent is extended or adjusted under 35 U.S.C. 154(b) by 437 days.

(21) Appl. No.: 18/115,183

(22) Filed: Feb. 28, 2023

(65) Prior Publication Data

US 2023/0201029 A1 Jun. 29, 2023

Related U.S. Application Data

(63) Continuation-in-part of application No. 17/552,248, filed on Dec. 15, 2021, now abandoned.

(51) Int. Cl.
*A61F 7/12* (2006.01)
*A61F 7/00* (2006.01)

(52) U.S. Cl.
CPC ........ *A61F 7/12* (2013.01); *A61F 2007/0006* (2013.01); *A61F 2007/0059* (2013.01); *A61F 2007/0095* (2013.01); *A61F 2007/126* (2013.01)

(58) Field of Classification Search
CPC ............ A61F 7/0085; A61F 2007/0006; A61F 2007/0063
See application file for complete search history.

(56) References Cited

U.S. PATENT DOCUMENTS

| | | | |
|---|---|---|---|
| 2002/0138121 A1* | 9/2002 | Fox ........................... | A61F 7/12 607/113 |
| 2008/0125626 A1* | 5/2008 | Chang .............. | A61B 17/12104 606/199 |
| 2016/0151201 A1* | 6/2016 | Kreck ....................... | A61F 7/12 607/105 |

* cited by examiner

*Primary Examiner* — Tigist S Demie
(74) *Attorney, Agent, or Firm* — Barry Choobin; Patent 360

(57) ABSTRACT

A method and apparatus for manipulating a temperature set-point of a human or homeothermic-animal for increasing or decreasing the body temperature above or below the prevailing body temperature for therapeutic purposes. The method includes the steps of warming or cooling sphenoid sinuses externally resulting in manipulation of the temperature of the pituitary gland which in turn results in manipulation of the body-temperature set-point and the body temperature manipulates accordingly to the new temperature set-point. A heat exchange medium can be used to warm or cool sphenoid sinuses and thus the pituitary gland. The heat exchange fluid can be liquid, or gas maintained at a predetermined temperature. Alternatively, a temperature-controlled probe can be used that upon contact with the sphenoid sinuses provides for the heat exchange.

9 Claims, 12 Drawing Sheets

METHOD AND APPARATUSES FOR MANIPULATING AN ENDOCRINE BODY-TEMPERATURE SET-POINT IN HUMANS AND WARM-BLOODED ANIMALS

CROSS-REFERENCE TO RELATED APPLICATIONS

This application is a continuation-in-part of a U.S. patent application Ser. No. 17/552,248 filed on Dec. 15, 2021, which claims priority from a U.S. provisional patent application Ser. No. 63/127,658, filed on Dec. 18, 2020, both of which are incorporated herein by reference in its entirety.

FIELD OF INVENTION

The present invention relates to a method and apparatus for manipulating an endocrine body-temperature set-point in humans and warm-blooded animals, and more particularly, the present invention relates to a method and apparatus for manipulating the temperature of the pituitary gland of a human or homeothermic-animal by influencing the sphenoid sinuses.

BACKGROUND

Like humans, most species of mammals and birds are homeothermic, i.e., they regulate their own body temperature, which can be either higher or lower than the surrounding environment. This self-regulation of body heat in warm-blooded animals is an evolutionary advantage over cold-blooded animals. However, like all bodily functions, the ability to regulate body temperature in warm-blooded animals and humans is not infallible. Irregulates in regulating the body temperature often led to critical medical conditions. However, heterothermic-system disorders are not widely recognized in the medical literature.

Body thermoregulation is controlled by the endocrine system, which is the same system that controls most of the bodily functions. Irregulates in the endocrine thermoregulation affect most bodily functions, and these effects can be observed as symptoms of the thermoregulation disorder. Thermoregulation of the body parts in a homeothermic person or animal appears to be conducted by comparing signals from the body parts to the signals from a single constant temperature-control body part. This control body part is the pituitary gland, which is a part of the endocrine system and is structured not to change the temperature away from its healthy normal range of temperature. The body temperature set-point is determined, apparently in the hypothalamus, by the temperature of the pituitary gland relative to all the other body parts.

Certain conditions, such as an infection or inflammation can cause the temperature of the pituitary gland to increase. Chemicals known as pyrogens can also cause the apparent temperature of the pituitary gland to increase, as observed by the hypothalamus. When the temperature of the pituitary gland increases for a period, the hypothalamus changes the body temperature set-point, and then, through the endocrine system, it orchestrates an assortment of bodily functions to increase the whole-body temperature to synchronize with the temperature increase in the pituitary gland. This condition creates the symptom of fever and the other extended symptoms of flu-like symptoms. Fever, which is a primary symptom for bodily infection and inflammation is caused by the hypothalamus re-setting the body-temperature set-point and which in turn results in a cascade of events causing most of the observable (and deadly) symptoms of illness associated with fever. Fever is generally referred to as a measurable increase in the body's temperature. Fever is one of the leading symptoms of innumerous described illnesses. The symptoms in the "flu-like symptoms" syndrome appear to be directly associated with the same cause that creates fever, and this stated cause is the raising of the body-temperature set-point.

Generally, external intervention to reduce the increased body temperature in feverish medical conditions is desired. Commercial fever reducers are available as over-the-counter pharmaceuticals, including nonsteroidal anti-inflammatory drugs (NSAIDs). Another popular fever-reducing over-the-counter pharmaceutical is acetaminophen. These remedies work in conjunction with a regimen of bed rest, hydration, and direct-body cooling. However, available over-the-counter pharmaceuticals have limited efficiency, use, and are known to have a negative impact on the body.

Besides bringing the increased body temperature to the normal temperature range, often desired is bringing the increased or normal temperature to sub-normal levels. Cooling a human body down, generally to the range of 89.6 to 93.2° F. (32 to 34° C.) for about 24 hours is referred to as therapeutic hypothermia. Hypothermia has been shown to be effective in improving the chance of recovering brain function in trauma and coma subjects.

Thus, considering the importance of manipulating the body temperature for both the therapeutic effects and well-being of humans and warm-blooded animals, a need is appreciated for a novel method for manipulating the body temperature.

Hereinafter, the phrases "set-point", "hypothalamus set-point", "temperature set-point", and "body temperature set-point" are interchangeably used and refers to a physiological body-temperature value around which the body temperature range fluctuates, and is variable and controlled by the hypothalamus.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a method and apparatus for manipulating the body temperature in humans and warm-blooded animals.

It is another object of the present invention that the method does not require chemicals to manipulate the body temperature.

It is still another object of the present invention to lower increased abnormal body temperature to normal temperature body levels.

It is yet another object of the present invention that the body temperature can be decreased below the normal body temperature levels.

It is an additional object of the present invention that the body temperature can be increased in hypothermia to normal body temperature levels.

It is a further object of the present invention that the body temperature can be increased above the normal body temperature levels.

It is still a further object of the present invention that the increased body temperature in fever due to a medical condition can be lowered.

It is yet a further object of the present invention that the method and apparatus provide for an instant decrease in body temperature for a feverish person.

It is an additional object of the present invention that the method is non-invasive.

In one aspect, disclosed are a method and apparatus for manipulating the body temperature of humans and warm-blooded animals by manipulating the body-temperature set-point and using the natural mechanisms of the body to manipulate the body temperature based on the body-temperature set-point.

In one aspect, disclosed is a method for lowering the body temperature by cooling the body-temperature set-point in synchronization with the induced lower body temperature by direct cooling, thereby inducing hypothermia without causing trauma to the endocrine system, and to some extent using the endocrine system to induce the hypothermia. The temperature can be lowered up to the temperature suitable for therapeutic hypothermia.

In one aspect, disclosed is a method and apparatus for raising the body-temperature set-point to raise the body temperature above normal body temperature levels, thereby providing a method to manage the body temperature of a human or homeothermic animal for therapeutic purposes.

In one aspect, disclosed is a method and apparatus for the management of body temperature that can be useful in different medical applications and medical treatments. Targeted temperature management (TTM) is a medical treatment that attempts to achieve and maintain a specific body temperature in a person for a specific duration of time and is usually an effort to improve health recovery after a period of stopped blood flow to the brain to reduce the risk of tissue injury. The disclosed method and apparatus can allow for the controlled management of body heat, at different temperatures, over a variable prescribed time regiment.

In one aspect, disclosed are a method and apparatus to facilitate inducing adjustments to the temperature set-point primarily intended for use when the set-point needs changing to a healthy temperature, such that to help fight illness and the symptoms associated with illness.

In one aspect, disclosed are the method and apparatus for inducing the temperature set-point to condition the body to a different temperature range for medical treatments, such as therapeutic hypothermia and targeted temperature management.

In one aspect, disclosed are a method and apparatus for externally cooling or heating the nasal sinuses to manipulate the temperature set-point.

In one aspect, disclosed is a method and apparatus for manipulating a temperature set-point of a human or homeothermic-animal for increasing or decreasing the body temperature above or below the prevailing body temperature for therapeutic purposes. The method includes the steps of warming or cooling sphenoid sinuses externally resulting in manipulation of the temperature of the pituitary gland which in turn results in manipulation of the body-temperature set-point and the body temperature manipulates accordingly to the new temperature set-point. A heat exchange medium can be used to warm or cool sphenoid sinuses and thus the pituitary gland. The heat exchange fluid can be liquid, or gas maintained at a predetermined temperature. Alternatively, a temperature-controlled probe can be used that upon contact with the sphenoid sinuses provides for the heat exchange.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
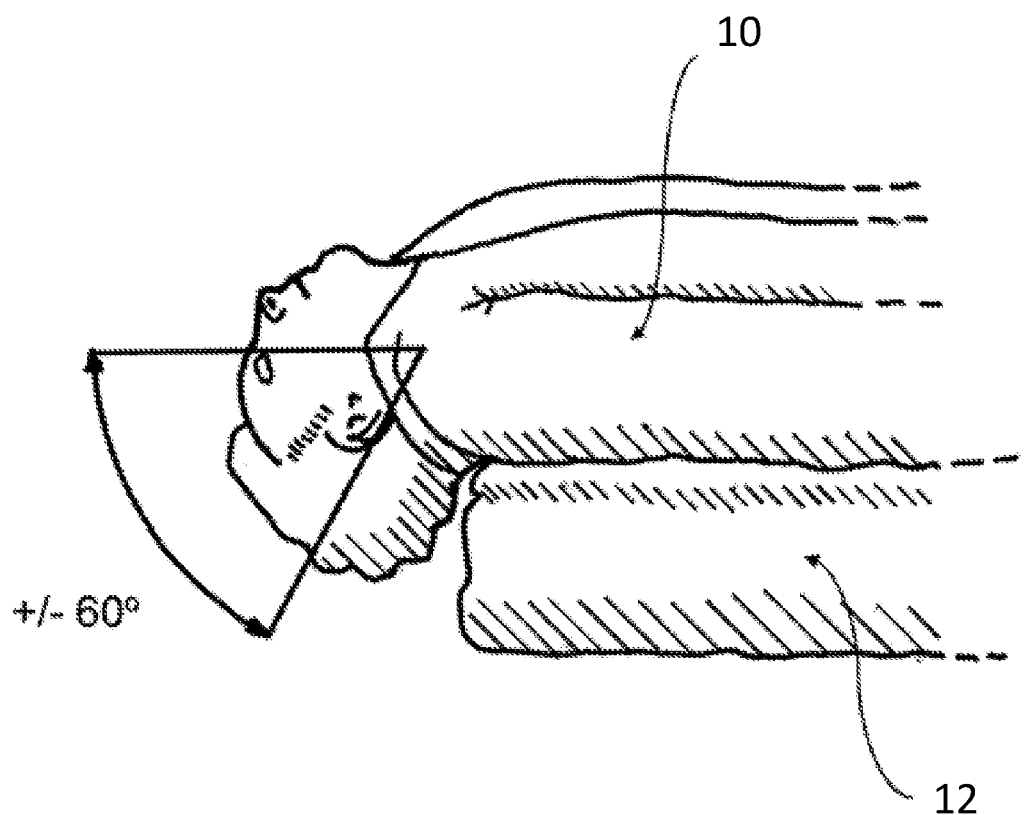
FIG. 1 illustrates a step of the disclosed method showing the bodily position of a person for administering temperature-regulated saline solution through the nose to flood the sphenoid sinuses to exchange heat from or to, the sphenoid sinuses, the head is approximately 60 degrees from a horizontal plane or 150 degrees from a vertical standing position, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed are a method and apparatus for manipulating the temperature of the pituitary gland and in turn manipulating the temperature set-point of the hypothalamus which in turn induces the endocrine system of the body to change the body temperature. The temperature of the pituitary gland can be modified by heating or cooling the sphenoid sinuses. Also, disclosed are a method and apparatus for non-invasively heating and cooling the sphenoid sinuses. Typically, the sphenoid sinuses surround the frontal part of the pituitary gland, and they are connected to the nasal sinuses allowing cooling of the pituitary through ventilation and evaporative cooling of nasal fluids while breathing. As the remainder of the pituitary is near the core of the body, this allows the mass of the pituitary to remain as the most stabilized temperature in the body. The sphenoid sinuses can be cooled to cool the pituitary gland and thus setting the temperature set-point to a lower temperature bringing down the body temperature from increased temperature to normal temperature levels or from the normal body temperature to below normal body temperature levels. It is emphasized that the disclosed method and apparatus provide for manipulating the temperature of the pituitary gland through cooling or warming the sphenoid sinuses, which in turn induce the endocrine system to lower or increase the body-temperature set-point accordingly. It is understood that certain embodiments of the disclosed invention can be described for the human body, however, the embodiments are applicable to homeothermic-animals in which temperature is regulated based on the pituitary gland, without departing from the scope of the present invention.

In one implementation, the temperature set-point can be reset to a new temperature for either bringing an increased body temperature due to a medical condition to normal body temperature levels or bringing the body temperature from normal body temperature levels to increased or decreased body temperature levels for therapeutic applications and medical uses.

In one implementation, the disclosed apparatus includes a heat exchange member that upon contact with the sphenoid sinuses can transfer heat to increase the temperature of the pituitary gland or withdraw the heat from the sphenoid senses to decrease the temperature of the pituitary gland. The heat exchange member can be a liquid, gas, or solid mass. The solid mass can be a tip of a catheter and the catheter can include means to heat or cool a tip of the catheter that upon coming in contact with the sphenoid sinuses can provide for heat exchange. Applying a lower temperature mass to the sphenoid sinuses, thereby lowering the temperature of the pituitary gland, can in time reset the body temperature set-point to a lower temperature which in turn can lower the body temperature. This new induced lower temperature may remove fever and associated symptoms, or in another application may reduce a body temperature to an abnormally low temperature to induce hypothermia. Applying a higher temperature mass, thereby raising the temperature of the pituitary gland can, in turn, reset the body temperature set-point to a higher temperature, which in turn increases the body temperature. This higher temperature provides management of body temperature and may have multiple medical uses. It is understood that any non-invasive means that can be inserted through the nose or mouth and intended for heat exchange with the sphenoid sinuses are within the scope of the present invention.

The hypothalamus is the main logic-regulation center for the endocrine system of the body. The hypothalamus determines what actions happen in the endocrine system and when, and these actions change the body's metabolism. The hypothalamus initiates the actions based on the signals it receives from the nervous system, and hormones, and from remembering what had been properly functioning, and when it was functioning in the person's recent activity. This memory is only a few days long because it only needs to tell if: what it is regulating today is the same as what the body was doing over the last few days or if something needs to change because of the signals the hypothalamus is receiving. The hypothalamus has access to this limited memory of relative pituitary-temperature readings and is always monitoring the present relative temperature state to compare with the past state. When the pituitary gland becomes warmer than the normal temperature, the hypothalamus detects this temperature inflection moving away from the current set-point position (or set-point temperature baseline). Apparently, when more than one-half of the short, recorded hypothalamus memory becomes that of an elevated temperature, the hypothalamus can suddenly accept the new higher pituitary temperature as correct and then adjust the set-point to this new higher temperature. This results in a cascade of metabolic events that creates the fever. When the new higher unsynchronized set-point is accepted, the entire heating and cooling system of the body changes through the endocrine system, which creates detectable symptoms, and the person can suddenly feel ill.

The hypothalamus regulates the set-point temperature for the body based on the dominant temperature reading of the pituitary gland in the hypothalamus's memory. Therefore, the sooner a pituitary gland is cooled after the first signs of fever are observed, the quicker the hypothalamus memory can be corrected by the lower, normal temperature, and accordingly, the sooner the fever can be broken. The longer a person has been suffering from the higher-pituitary-gland-temperature condition, the longer the memory of the higher set-point temperature, and the longer the method may take to break the fever. In one implementation, disclosed apparatus can provide for multiple heat exchange members to hasten the change in temperature set-point.

Figure 4:
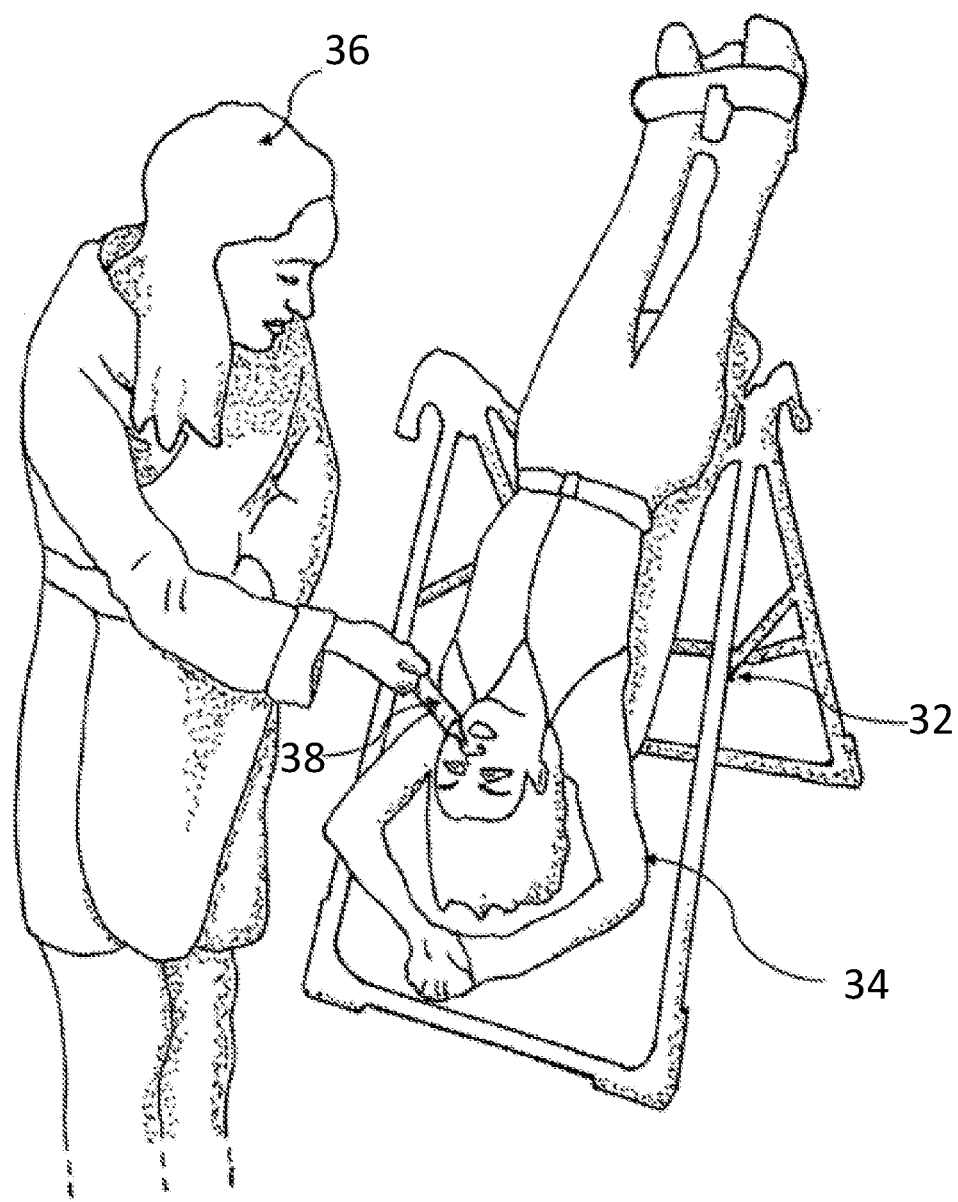
FIG. 4 illustrates the bodily position of a person at 150° inclination (from the vertical plane) and the administration of liquid into the nose of the person using an irrigation syringe by an attendant, according to an exemplary embodiment of the present invention.

In certain implementations, disclosed is the method that can be used when the subject is conscious and can respond to instructions. The patient can be instructed to position themselves in a predefined body position. Referring to FIG. 1 which shows a person 10 lying on the bed/mattress 12 with the head positioned down and backward from an edge of the bed to about 60° from the horizontal plane or 150° from the vertical standing position. Under the shown position, liquid, such as saline at the desired temperature can be delivered through the nasal passageway to flood the sphenoid sinuses, in order to exchange heat from or to the sphenoid sinuses. This treatment may result in a rapid response in subjects that have just started a fever. For example, within 4 days before starting the treatment. In subjects with mature fever, the method can be used as a first aid, or this may be all that the subject is in need of recovery. In the disclosed method, at first, the patient can be stabilized in a predetermined position as shown in FIGS. 1 and 4. A liquid medium, such as saline can then be bought from room temperature to the predetermined temperature. The liquid medium can be conditioned (heat or cool) in a pre-measured dispensing vessel or syringe, or a conditioned liquid medium can be taken in the dispensing vessel or syringe. Optionally the person can be restrained in the predetermined position. In the case of animals, retraining the animal can be preferred. As shown in FIG. 1, with the head positioned down to about 60° or any other angle depending upon the comfort of the patient, the liquid medium can be delivered into the nose cavity for irrigating the sphenoid sinuses, the liquid medium can flow under gravity without runoff to other body cavities or the throat. About 10 ml of the liquid medium at the predetermined temperature can be delivered in one application for an adult, or analogous volume in a child or an animal. More liquid than is required to flood the sphenoid sinuses may be detrimental to the desired effect. This saline solution should be just enough volume to pool, due to gravity, on the top back of the nasal sinus at the location of the sphenoid sinus, preferably through the opening to the sphenoid sinuses. It is best if the human or animal breathes through the mouth to avoid breathing through the sinuses during this step. The liquid medium can be allowed to remain in the nose cavity for the heat exchange between the liquid medium and the sphenoid sinuses for a predetermined duration, such as one minute. After the predetermined duration, the liquid medium can be sucked from the mouth or nose. Alternatively, the person can be allowed to turn the head sideways to let the liquid medium flow out under gravity. Thereafter, the body temperature can be checked, and the steps can be repeated till the desired body temperature can be achieved.

Figure 2:
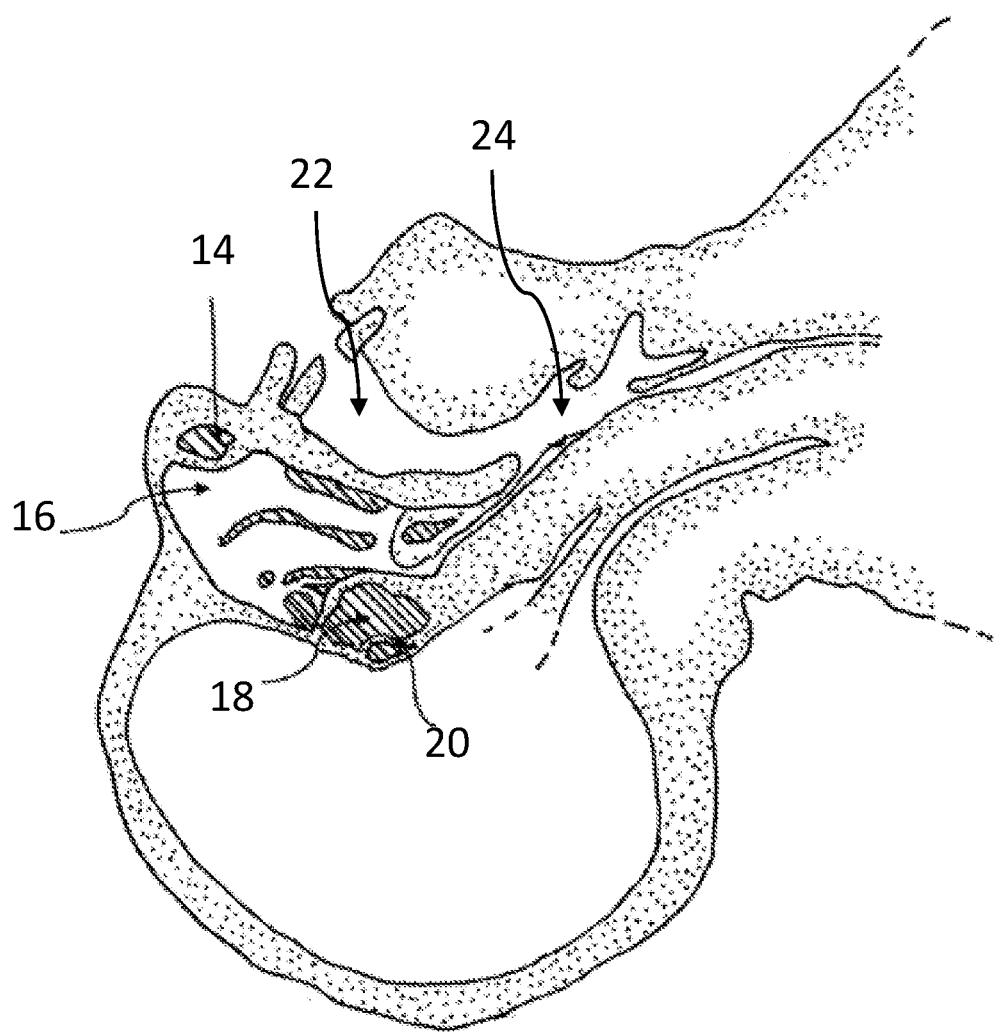
FIG. 2 is a cross-section of a human head as shown in FIG. 1, illustrating the location of the nasal passage, the sinus passage, the sphenoid sinuses, and the pituitary gland, and further displaying the locational relevance to the oral passage and the throat.

Referring to FIG. 2, which shows a cross-section of the head in the liquid-administration position as shown in FIG. 1. FIG. 2 shows the location of the nasal passage 14 through which the liquid medium can be poured, the sinus passage 16, the sphenoid sinuses 18, and the pituitary gland 20, further displaying the locational relevance to the oral passage 22 and the throat 24. The liquid medium can be delivered through nasal passage 14 into the sinus passage 16 under gravity. The liquid medium in the sinus passage 16 can contact the sphenoid sinuses 18 for heat exchange, wherein heat is transferred from the mass at higher temperature to the mass at the lower temperature between the liquid medium and the sphenoid sinuses 18.

Figure 3:
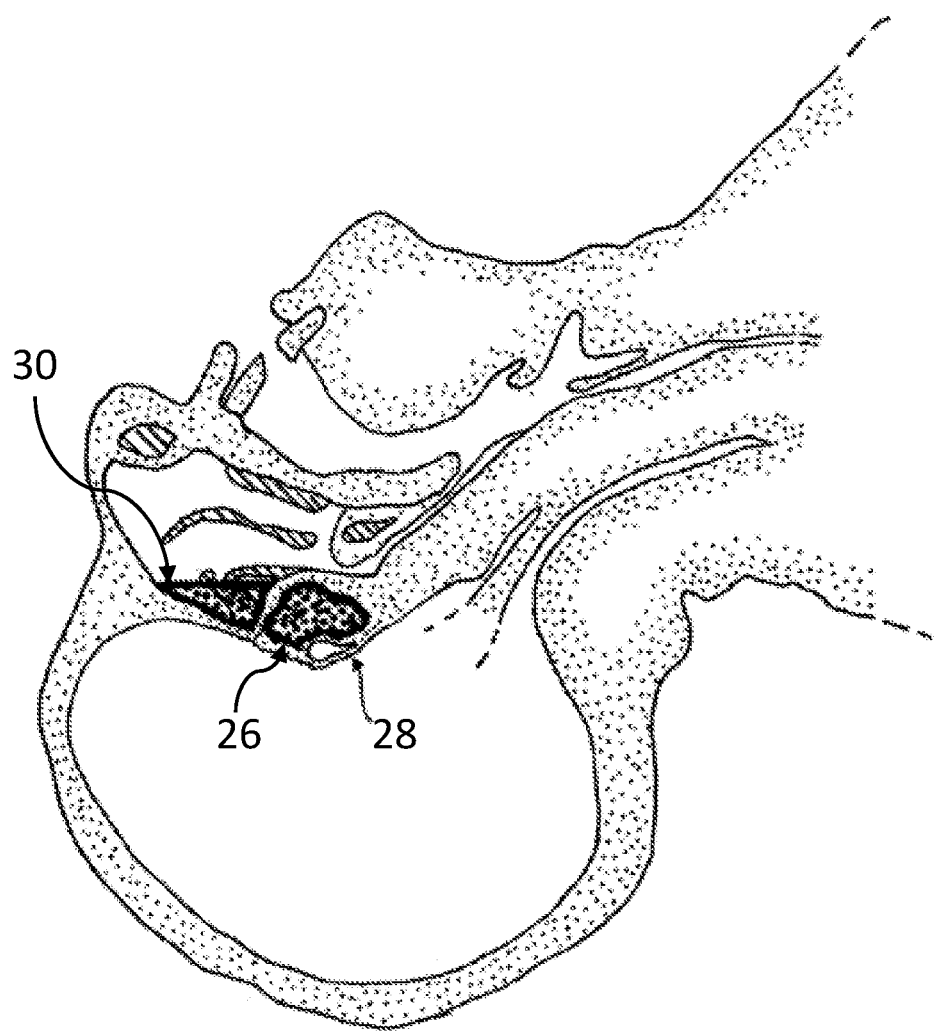
FIG. 3 is another cross-section of a human head as shown in FIG. 1, illustrating the location of the sphenoid sinuses, and the pituitary gland, and the desired level of fluid ponding, the locational relevance to the oral passage, nasal passage, and the sinus passage, and the sphenoid sinuses.

Referring to FIG. 3 is the cross-section view further showing the desired level of liquid medium for effective heat transfer. FIG. 3 shows the sphenoid sinuses 26, the pituitary gland 28, and the desired level of liquid medium 30. The liquid will pond at the sphenoid sinuses and exchange heat with the sphenoid sinuses and the adjacent pituitary gland. An additional volume of fluid can flood other areas and exchange heat with other parts of the inner head through the sinuses, which is not desired.

Referring to FIG. 4 which shows another body position suitable for instilling the liquid medium into the nose under gravity. FIG. 4 shows an inversion table 32 upon which a person 34 can be restrained and then table 32 can be inverted to comfortably attain the 150-degree inclination (from standing position) for the application of the liquid medium. FIG. 4 further illustrates an attendant 36 using an irrigation syringe 38 to instill the liquid medium at the predetermined temperature into the nose cavity of the person 34. It is understood that the syringe is only shown for illustration, and any other dispensing tool or device can be used to instill the liquid medium without departing from the scope of the present invention.

Figure 5:
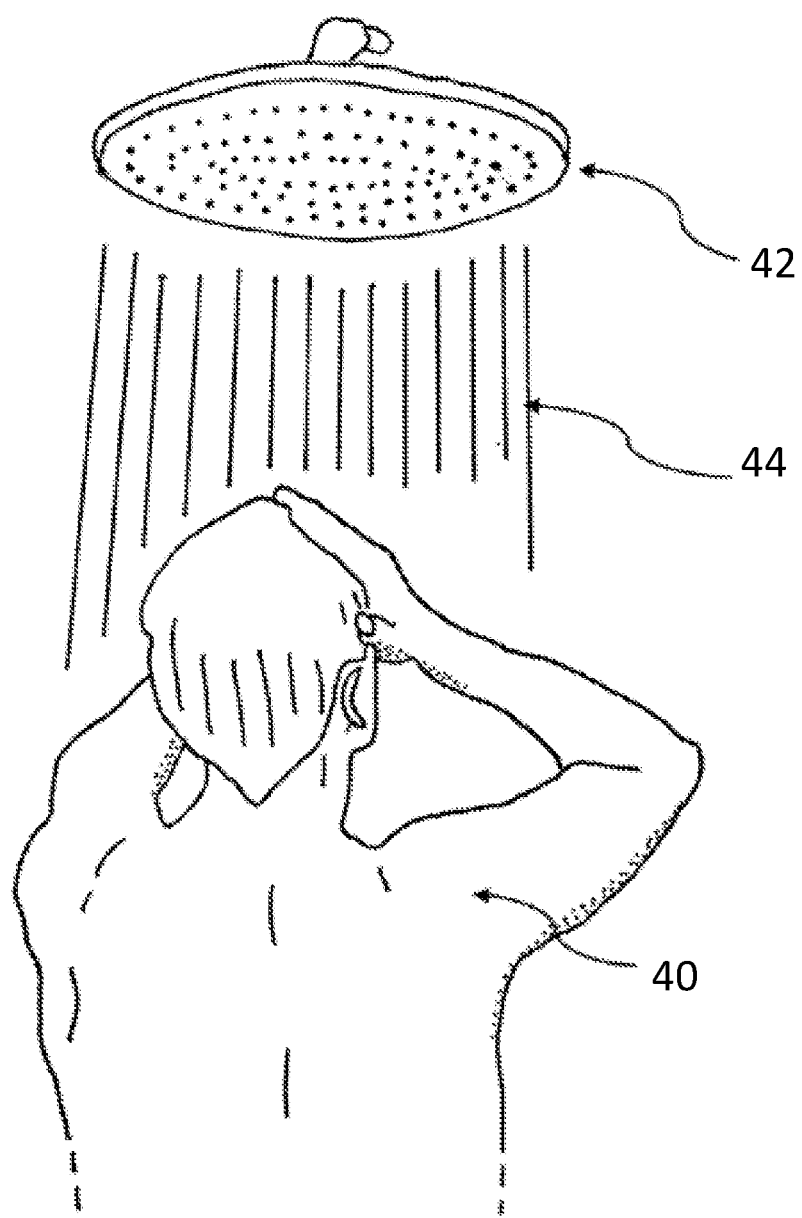
FIG. 5 illustrates a step of the disclosed method, i.e., direct cooling of the body mass using available standard methods such as water bath-immersion, or shower-immersion, utilizing temperature-controlled water relative to the desired heating or cooling effect, according to an exemplary embodiment of the present invention.

FIG. 5 illustrates a step of a disclosed alternative method for manipulating the body temperature that can include additional direct heating or cooling the body or body portion. FIG. 5 shows a person 40 under a showerhead 42 and hot or cold water 44 can be poured over the body of the person. It is understood that FIG. 5 only illustrates an example of direct cooling, however, any method for direct cooling, such as immersion in water at predetermined temperature or application of hot/cold pads, and the like known to a skilled person for application or removal of heat from a body can be used and any such method is within the scope of the present invention. The external direct heat exchange can be used in synchronization with the manipulation of the body-temperature set-point. Using additional standard methods for manipulating the body temperature can help achieve the desired body temperature quickly and easily without shocking the endocrine system. Shower head 42 can evenly spread the heat on the body of the person. The step of direct cooling can be implemented before or after manipulating the temperature set-point and can be repeated a number of times as desired.

Figure 6:
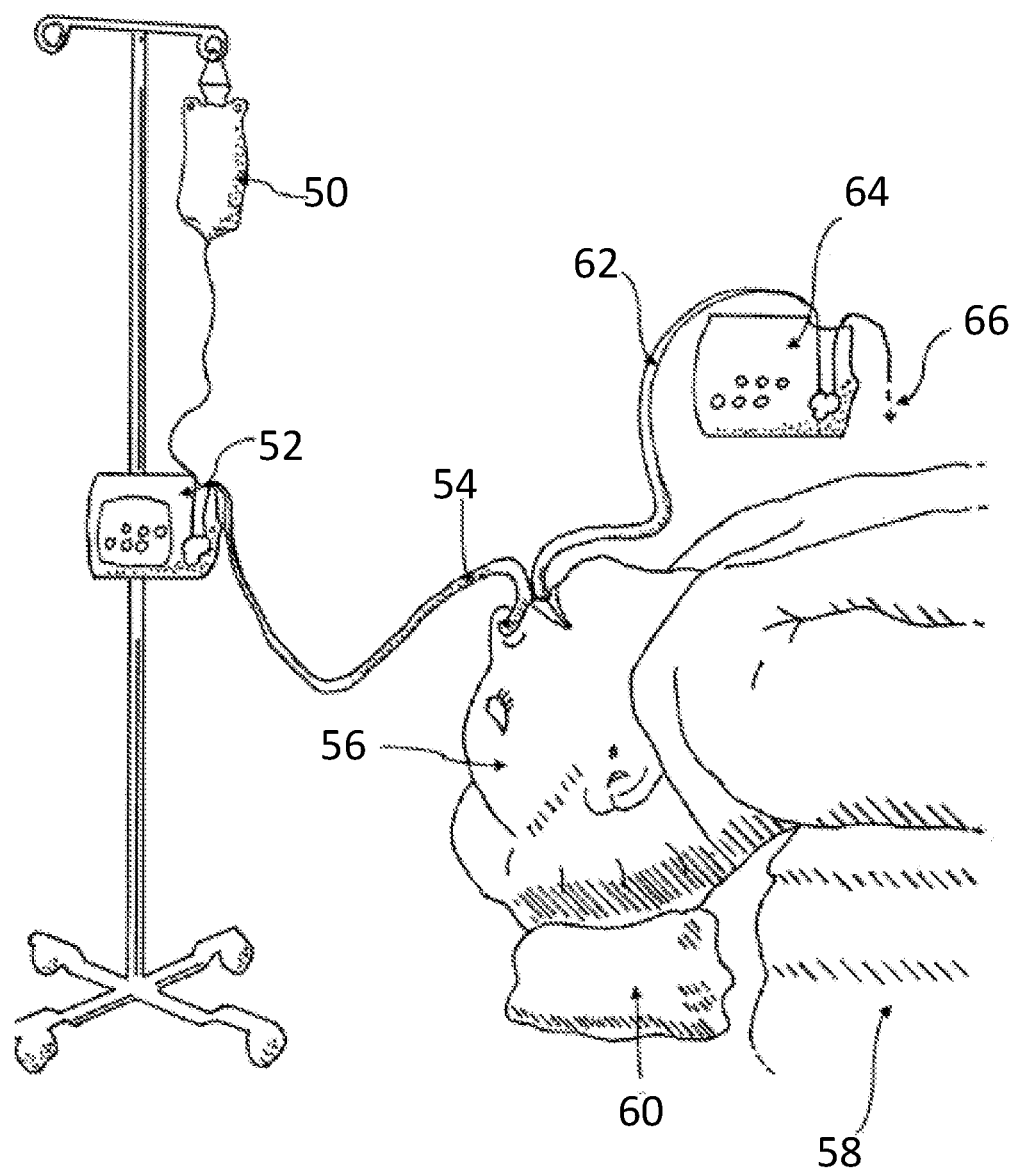
FIG. 6 displays an apparatus including the fluid supply source, a mechanical fluid-feed pump, flow rate regulator, and supply tubing for administrating saline solution (or other suitable temperature-regulated liquid), according to an exemplary embodiment of the present invention.

The disclosed method of flooding the sphenoid sinus with liquid at a predetermined temperature for a short duration can be preferable for onset fevers. For mature fevers, the memory of the hypothalamus may not allow a momentary change in the pituitary gland temperature to re-adjust the body-temperature set-point when a body-temperature set-point has been in an altered temperature range for an extended time. This is because the baseline fevered temperature of the pituitary gland may be the dominant temperature in the hypothalamus memory or the conditions that cause the hypothalamus to read that the pituitary gland hot may still be in the body, causing the hypothalamus to keep the body-temperature set-point at the fevered baseline temperature. Also, disclosed are the method for prolonged or continuous heat exchange with the sphenoid sinuses. Prolonged or continuous heat exchange between the disclosed apparatus and the sphenoid sinuses may be required to reduce the temperature for therapeutic hypothermia, or to induce increased body temperature above normal body temperature levels. The disclosed method can keep the pituitary gland at the manipulated temperature for a longer duration in order to overcome the temperature in the memory of the hypothalamus. The person can be positioned as shown in FIG. 1 i.e., the head positioned down backward from the bed. A low-flow fluid stream of chilled saline solution, or other suitable liquid, can be fed into the nose by a continuous-feed pump. Alternatively, tubing with a reservoir of saline solution (as in an IV bag and tubing) can be connected to the nose in a manner that causes the gravity-fed fluid to drip into the nostril and run to the area of the sphenoid sinus. Optionally, a suction tubing can be placed into the person's mouth so that the liquid can be sucked from the mouth. FIG. 6 illustrates an exemplary embodiment of the apparatus having a fluid supply source 50, a mechanical fluid-feed pump and flow rate regulator 52, and supply tubing 54 that is shown positioned over or into the nasal passage of a person 56, such that the liquid medium can flow into the nose under gravity to flood the sphenoid sinuses. FIG. 6 also shows person 56 resting on the bed 58 and additionally head support 60 can provide support to the head. FIG. 6 further shows another hollow suction tubing 62 inserted in the mouth of the person such that after the liquid medium collected in the sinus passage can be sucked through the hollow suction tubing 62 and the fresh liquid medium can continue flowing into the sinus passage. The disclosed apparatus can further include a mechanical pump 64 coupled a disposal stream 66, adequately to prevent overflow of fluid within the person and adequate for balanced flow between supply and suction exhaust. The volume of water that can be administered can be controlled to avoid having more water than needed in the sinuses to cover this area. A slower drip of liquid medium can be used if cooler. A thermometer can be used to measure the temperature of the liquid medium in the disposal stream that can provide data to see if the fluid-feed rate can be slowed or accelerated. The ideal rate and temperature for the feed can be determined by experimentation. The sinuses are accustomed to room temperature air and exposed to the colder air in the winter season, therefore a temperature range from around 50 to 75° F. may be adequate for cooling the pituitary gland, without adverse effects, when treating a fever. It is understood that the objective is not how cool the pituitary gland can be, but to keep the pituitary gland at a normal room temperature for as long as it takes to break the fever. If needed, due to the lack of a suction pump, the subject can be asked to blow liquid in the mouth through the exhaust tubing which is placed into the subject's mouth so that the waste fluid can be expelled through it.

Figure 7:
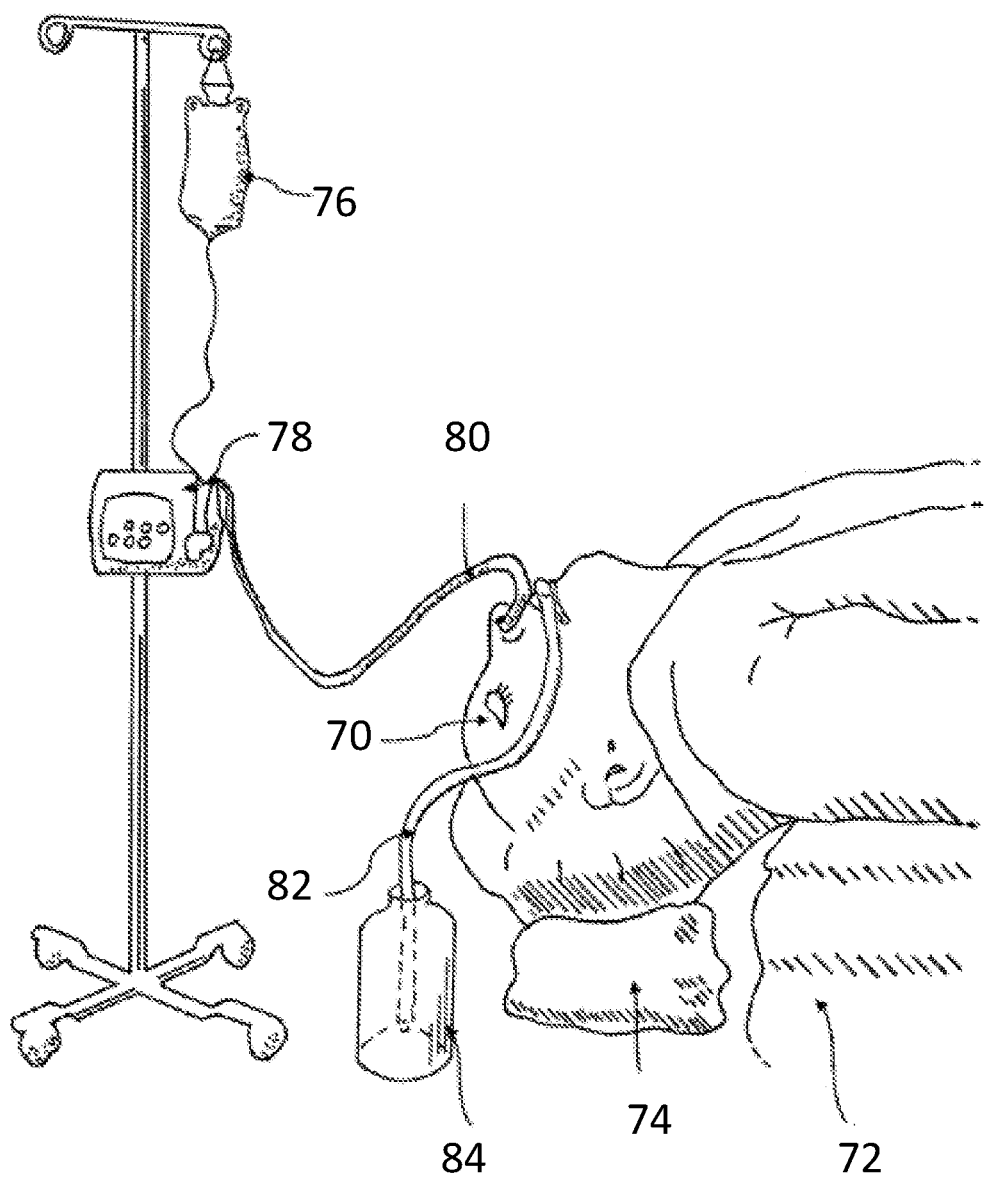
FIG. 7 shows the apparatus as in FIG. 6 with an alternative exhaust configuration, according to an exemplary embodiment of the present invention.

Referring to FIG. 7 which shows an alternate embodiment of the disclosed apparatus. FIG. 7 shows a person 70 laying on bed 72 with the head positioned down and backward from the edge of bed 72. A container 76 containing the liquid medium at the predetermined temperature can be mounted to a stand. A pump 78 to circulate the liquid medium can also be seen mounted to the stand. The intake tubing 80 can deliver the liquid medium to the nose of the person 70. Another exhaust tubing 82 can also be seen being inserted into the subject's mouth, such that after the liquid medium gets collected in the mouth, the liquid can be forced to leave through the mouth of the person who can blow the liquid through the exhaust tubing 72 into a waste receptacle 84. The liquid medium upon coming in contact with the sphenoid sinuses undergoes heat exchange and the exhausted fluid can be expelled out and replaced by fresh liquid at the predetermined temperature, such that the pituitary gland can be maintained at the manipulated temperature for a period long enough for the hypothalamus to adjust the body-temperature set-point, and the desired body-temperature set-point can be attained. Optionally, direct cooling or warming can be used in addition to the above steps before, after, or during the administration of the liquid medium to the sphenoid sinuses.

In certain embodiments, disclosed is another method for manipulating the set-point of a body temperature by warming or cooling the pituitary gland for longer-term applications in order to overcome the temperature in the memory of the hypothalamus.

Figure 8A:
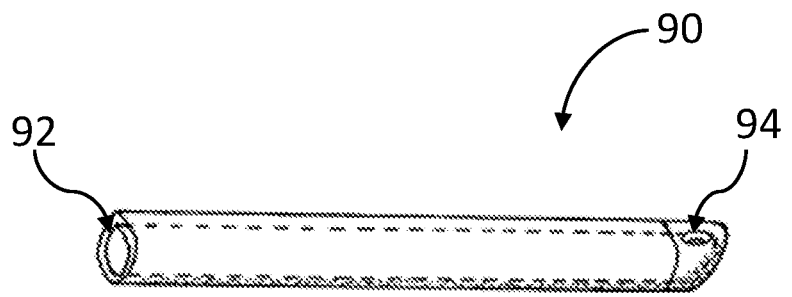
FIG. 8a shows a catheter for administering a temperature-controlled substance into an area of the sphenoid sinuses, according to an exemplary embodiment of the present invention.

The disclosed method can provide for continuous heat exchange and the person can be sitting or lying comfortably in desired bodily positions. The person may or may not be conscious while administering the disclosed method and the treatment can be continued for the whole day. The method can be particularly useful for mature fevers that are unresponsive to other treatments. The disclosed method includes a step of providing a catheter that can be inserted into the nasal cavity and can direct a heat-exchanging fluid (gas or air) to the sphenoid sinus for heat exchange. The flow rate of gas can be adjusted to target the sphenoid sinuses without affecting the surrounding tissues. In one implementation, the catheter can be constructed of a pliable material that retains the shape that it is formed into, and the catheter can be inserted into the nasal cavity. The catheter can be designed for ease of insertion and effective irrigation of the sphenoid sinuses. Referring to FIG. 8a-8e which shows exemplary embodiments of the catheter for irrigating the sphenoid sinuses. FIG. 8a shows a catheter 90 that has an inlet 92 that can be connected to a fluid intake tubing. The other end of the catheter is closed and has a slot or hole on the upward side, such that the fluid flow can be diverted in an oblique to perpendicular angle from the catheter through the slot. Alternatively, the catheter can have an elbow attachment inserted, welded, or molded into the forward end in such a way as to divert the fluid flow from the primary direction of the catheter to an oblique to a perpendicular angle to the catheter.

Figure 8B:
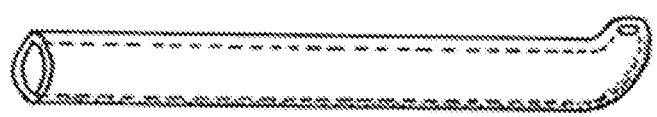
FIG. 8b shows a catheter for administering a temperature-controlled substance into an area of the sphenoid sinuses, according to an exemplary embodiment of the present invention.
Figure 8C:
FIG. 8c shows a catheter for administering a temperature-controlled substance into an area of the sphenoid sinuses, according to an exemplary embodiment of the present invention.
Figure 8D:
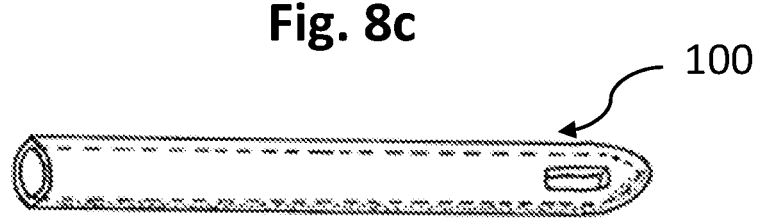
FIG. 8d shows a catheter for administering a temperature-controlled substance into an area of the sphenoid sinuses, according to an exemplary embodiment of the present invention.
Figure 8E:
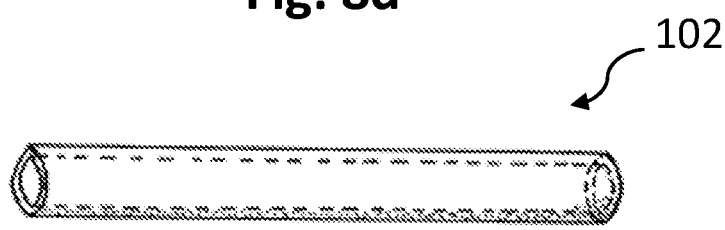
FIG. 8e shows a catheter for administering a temperature-controlled substance into an area of the sphenoid sinuses, according to an exemplary embodiment of the present invention.

The catheter can be manually inserted into the nasal cavity, or a catheter can also be surgically inserted into the human or animal to access and position the catheter adjacent to the location of the pituitary gland and force the fluid to contact the sphenoid sinuses and/or pituitary gland. The disclosed catheters can be used to deliver fluids including gas, air, liquid, mist, and the like to the sphenoid sinuses. FIG. 8b shows catheter 96 of an alternate design. Similarly, FIG. 8c shows the catheter 98, FIG. 8d shows the catheter 100, and FIG. 8e shows the catheter 102. Optionally, a second tubing to draw the fluid from the nasal cavity can also be provided for maintaining a circulation of the fluid at the predetermined temperature. The suction line in the second nostril can quickly remove any excess heat-exchanging gas or air before it cools the adjacent tissues.

The inlet of the catheters can be attached to a supply line using a suitable catheter-connection device. The manufactured length of the catheters can be varied according to the size variations of human heads. The aperture in the head of the catheter can direct the fluid to the sphenoid at any given angle, preferably obtuse to perpendicular, but maybe open-ended if the catheter can be positioned to directly affect the sphenoid sinuses. The head of the catheter can be welded to the catheter tubing as shown in FIG. 8a. The catheter can be extruded or deformed to have the head portion bent as shown in FIG. 8b. The head of the catheter may also be molded with an oblique or perpendicular aperture as shown in FIG. 8c. The head of the catheter may also be molded with an oblique or perpendicular slot, as shown in FIG. 8d. Still, alternatively, the catheter can be molded or cut, or the end of the catheter may be open-ended, as shown in FIG. 8e. The source for the heat-exchange fluid can be a pump or a compressed-gas cylinder. An optional thermometer in the expelled air or gas can provide data to see if the feed rate can be slowed or accelerated. Experimentation can provide the ideal rate and temperature for the feed.

Figure 9:
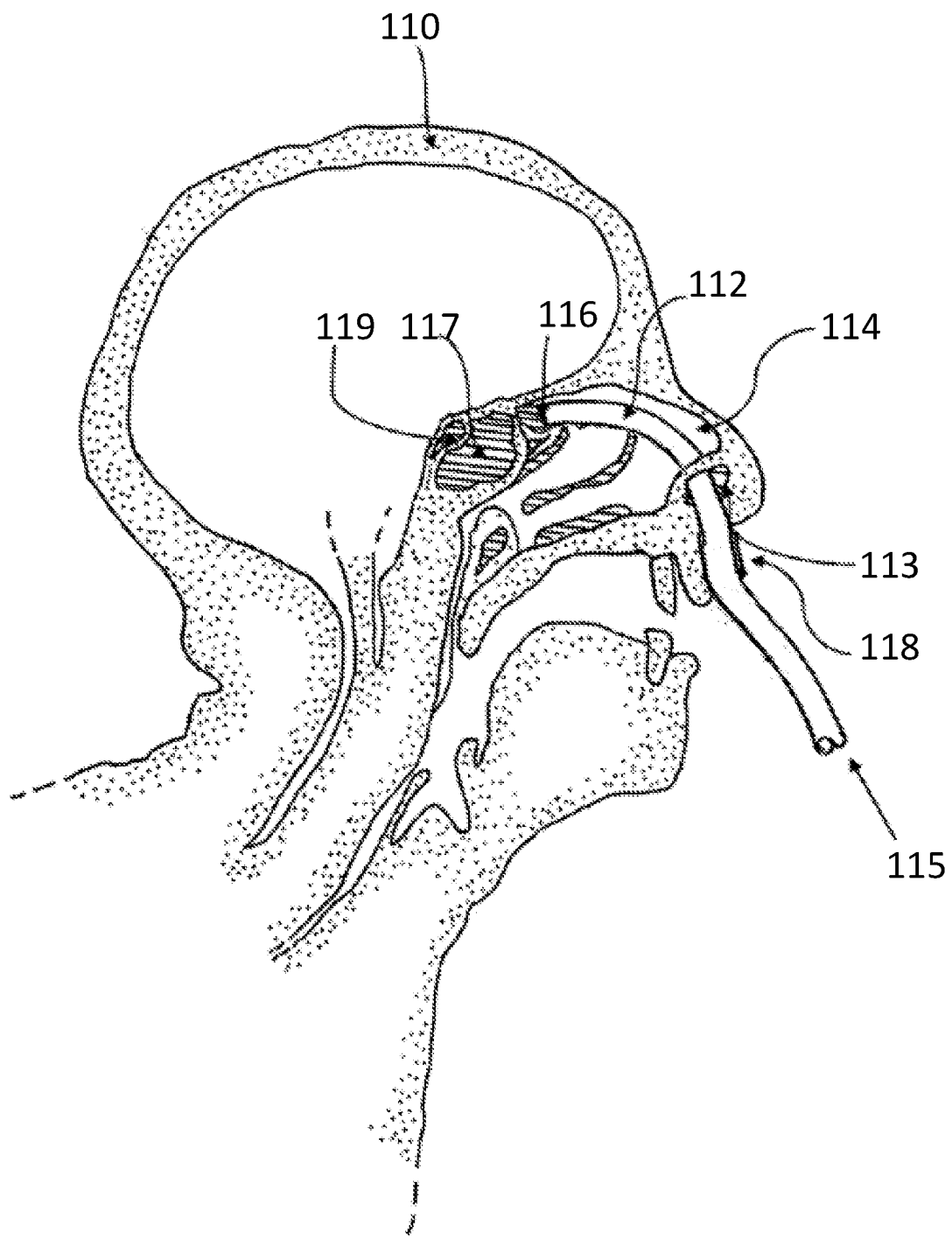
FIG. 9 is a cross-section of a human head that shows a catheter inserted through the nasal passage and to the nasal sinuses for injecting the temperature-controlled substance, according to an exemplary embodiment of the present invention.

Referring to FIG. 9 which shows a cross-section of a human head 110 that shows a supply catheter 112 that is inserted through the nasal passage 113 and nasal sinuses 114, and that is injecting a temperature-ready gaseous fluid (air, gas, gas mixture, or liquid/gas mixture, such as a mist) 115 from a hollow supply tubing (not shown) to a position within the sinuses 116, so as to direct the induced flow of temperature-ready fluid toward the opening of the sphenoid sinuses 117. Said catheter can be secured with a position-stabilizing device such as medical tape 118 to prevent early detachment. Heat exchanged within the sphenoid sinuses 117 will conduct the desired temperature change onto the adjacent pituitary gland 119.

In one implementation, the method can include the steps of supplying air, gas, gas mixture, or liquid/gas mixture (such as a mist) at the predetermined temperature; providing a tubing with catheter for insertion into the nasal sinuses, the catheter and the tubing can include a position-stabilizing device, such as with medical tape or another device; inserting said supply catheter connected to said supply of temperature-ready gaseous fluid to a position within the sinuses, and affixing said hollow tubing with said position-stabilizing device to prevent early detachment so as to direct the induced flow of temperature-ready fluid toward the opening of the sphenoid sinuses; and circulating gaseous fluid and waiting for the heat to exchange between the administered fluid and the sphenoid sinuses, further onto the pituitary gland, and further waiting until the hypothalamus detects the heat exchange of the pituitary gland for a period long enough for the hypothalamus to adjust the body-temperature set-point, resulting in the desired body-temperature set-point being attained. It is to be noted that steps of direct cooling the body as described before can be used without departing from the scope of the present invention.

In one implementation, disclosed is another method for manipulating the temperature set-point in humans and warm-blooded animals. The disclosed method uses a probe of semi-rigid to rigid construction and is capable of exchanging heat with the contacted human or animal tissue, to affect the temperature of the immediate sphenoid area, and avoid affecting the temperature of the surrounding tissues.

In this method application, the mass from which the heat exchange is induced is a solid, or semi-solid (as opposed to a fluid, liquid, or gas, as in the previous method applications). This method application can be used to quickly induce a momentary heat exchange with a predetermined temperature heated or cooled probe, or it can be used for longer-term applications in order to overcome the temperature in the memory of the hypothalamus. The longer-term applications may be conducted using an induced electric field, or a probe of semi-rigid to rigid material that has a temperature-regulated fluid enclosed and circulating within it.

The disclosed method can also provide for surgical implantation of the probe for both the human or animal to access and position the probe adjacent to the location of the pituitary gland. However, it may be preferable to insert the catheter through the nasal passage into the sinus cavities, and further into the sphenoid sinuses.

Figure 10:
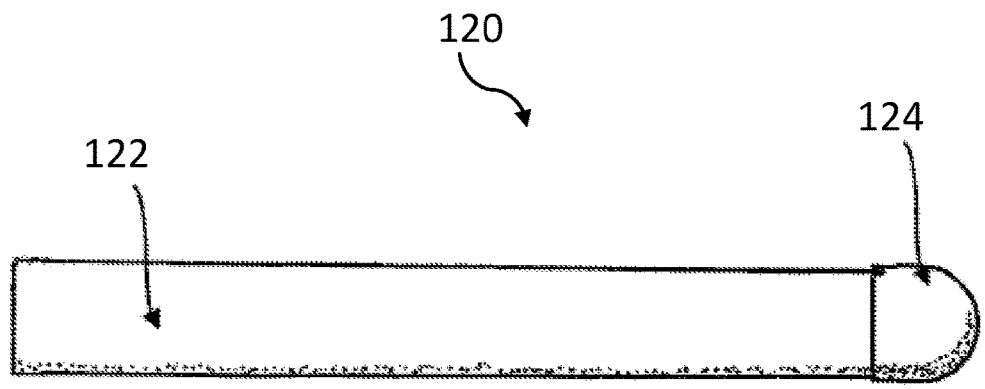
FIG. 10 illustrates a directional solid probe of semi-rigid to rigid material capable of exchanging heat with the human or animal tissue, according to an exemplary embodiment of the present invention.

Referring to FIG. 10 illustrating an implementation of probe 120 of semi-rigid to rigid construction for exchanging heat with the human or animal tissue contacted. The probe 120 can either be pre-cooled or pre-heated to affect the desired heat exchange. Body 122 of probe 120 can be made from insulating material and head 124 of probe 120 can be made from dense, heat-conducting material.

The method can include the steps of providing a directional probe of semi-rigid to the rigid material, capable of exchanging heat with the human or animal tissue contacted; inserting said directional probe through the nasal sinuses to contact the area of the sphenoid sinuses, in a manner that will result in the area of the sphenoid sinuses to exchange heat with the said directional probe, keeping the probe in contact with the sphenoid sinuses for a predetermined duration for the heat to exchange between the probe and the sphenoid sinuses, and until the hypothalamus detects the heat exchange of the pituitary gland for a period long enough for the hypothalamus to adjust the body-temperature set-point, and the desired body-temperature set-point has been attained. The predetermined duration can be for a longer term in order to overcome the temperature in the memory of the hypothalamus. The disclosed method can be advantageous by providing a continuous heat exchange for a long period while the person can be sitting or lying comfortably in desired body positions. The person may or may not be conscious during administration and the said predetermined period; therefore, can be used for the whole day while the patient is awake or sleeping. It requires connection to a probe through the nose into the sinuses. This can be used for a subject that has had a body-temperature set-point that has been in a range for some time that needs changing, as when a subject has a mature fever for some time, or for any other reasons.

The disclosed probe can be connected to a power source through two or more conductive wires connecting an electric resistance heating element or coil, either located at the tip of the said probe or, at a thermally conductive material that transfers the heat energy to the tip of the said probe when the probe is used for heating. Alternatively, the apparatus can include a Peltier electric cooling device connected to the power source and conductively connected to a heat-conducting probe core either located at the tip of the said probe or, at an external location, and transferring the heat energy from the probe tip through the thermally conductive material toward the connected Peltier cooling device, thereby transferring the heat energy from the tip of said probe, from the sphenoid sinuses and further from the pituitary gland, inducing a cooling effect to the pituitary gland. The directional probe can include a stabilizing device such as medical tape that can be used to secure the probe.

Figure 11:
FIG. 11 illustrates another directional solid probe for exchanging heat with the bodily tissue that induces heat through electrical resistivity, according to an exemplary embodiment of the present invention.

Referring to FIG. 11 which shows an implementation of a directional probe that can be electrified to induce heat through electrical resistivity. The manufactured length of the probe is variable due to the size variations of human heads and is presented here with an arbitrary length. The conductive electrical wires 126 provide energy from any standard electrical source through the body of the probe 128 which is of electricity and temperature insulating material, and the head of the probe 130 is dense, heat-conducting material and houses the electrical resistivity heating coil 132.

Figure 12:
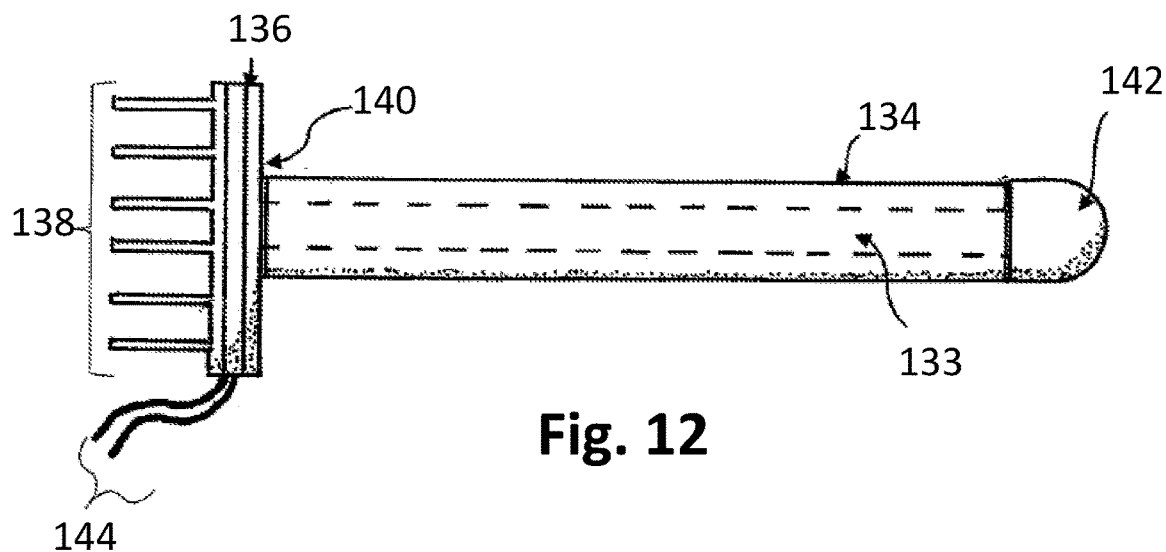
FIG. 12 illustrates another directional probe that has a temperature-conducting core encased in temperature insulating material and connected to an electrified Peltier assembly for cooling, according to an exemplary embodiment of the present invention.

Referring to FIG. 12 which shows a directional probe of semi-rigid to rigid construction capable of exchanging heat with the human or animal tissue contacted, and that has a temperature-conducting core 132 encased in temperature insulating material 134 connected to an electrified Peltier assembly 136 typically with heat dispersing fins 138 to transmit induced cold from the cold side of said assembly 140 through the said core to the temperature-conducted head 142. Conductive electrical wires 144 provide energy from any standard electrical source. The manufactured length of the probe is variable due to the size variations of human heads and is presented here with an arbitrary length.

In one implementation the disclosed method using the probe as shown in FIGS. 10-13 can be used for manipulating the set-point of a body temperature with a pituitary gland for longer-term applications in order to overcome the temperature in the memory of the hypothalamus, by using a probe of semi-rigid to rigid material that has a temperature-regulated fluid (liquid or gas) that is enclosed and circulating through it.

The directional probe of semi-rigid to the rigid material, capable of exchanging heat with the human or animal tissue contacted, is constructed from a hollow tubing and allows pre-cooled or pre-heated fluid flowing through the hollow tubing to said probe, in order to achieve the desired heat exchange and return the probe-contacted fluid through a second tubing for exhaust. The method application of this invention is comprising a hollow directional probe of semi-rigid to rigid material, capable of exchanging heat energy primarily through tip of the said probe; the interior of the hollow tubing is accessible by fluids through an inlet tubing, circulates and leaves through an exhaust tubing, and allows pre-cooled or pre-heated fluid flowing through the hollow tubing to said probe to affect the desired heat exchange and return the probe-contacted fluid through the exhaust tubing; a thermal conductive material that transfers the heat energy to the tip of said probe, onto the sphenoid sinuses and further onto the pituitary gland; said directional probe of semi-rigid to rigid material with position-stabilizing device such as with medical tape; step of inserting said directional probe of semi-rigid to rigid material through the nasal sinuses to contact the area of the sphenoid sinuses, in a manner that causes the area of the sphenoid sinuses to exchange heat with said directional probe, further onto the pituitary gland; and step of waiting for the heat to exchange between the directed probe and the sphenoid sinuses, further onto the pituitary gland, and waiting until the hypothalamus detects the heat exchange of the pituitary gland for a period long enough to allow the hypothalamus to adjust the body-temperature set-point, and the desired body-temperature set-point has been attained. It is to be noted that the steps of direct cooling or warming the body using methods such as water immersion, shower, application of heating or cooling pads can be incorporated without departing from the scope of the present invention.

Figure 13:
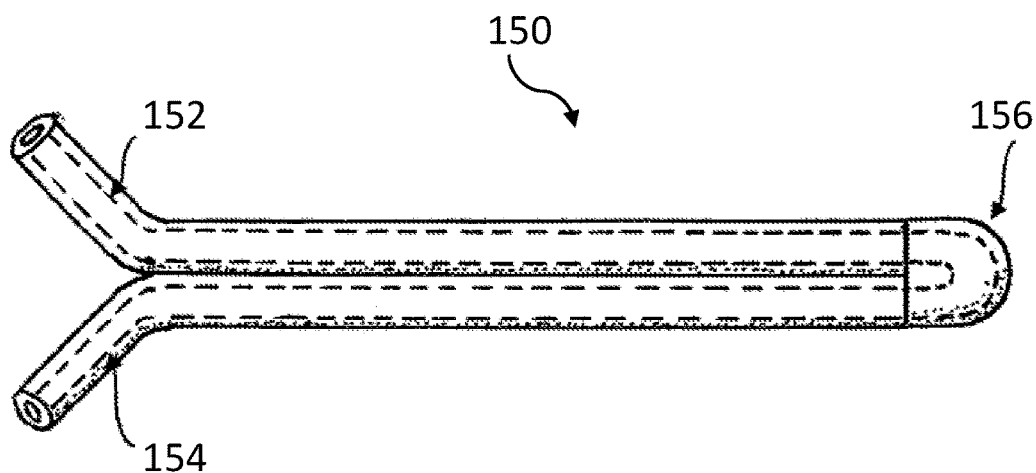
FIG. 13 illustrates another directional probe that allows pre-cooled or pre-heated fluid flow through the hollow tubing for heat exchange, according to an exemplary embodiment of the present invention.

Referring to FIG. 13 which shows a directional probe 150 of semi-rigid to rigid material that is capable of exchanging heat with the human or animal tissue when contacted, that is constructed with hollow tubing 152, that allows pre-cooled or pre-heated fluid to flow through the hollow tubing, to said probe head 156 to incur the desired heat exchange, and then to return the probe-contacted fluid through a second exhaust tubing 154. The manufactured length of the probe is variable due to the size variations of human heads and is presented here with an arbitrary length. Optionally, the exhaust tubing may be omitted, and the exhausted fluid could be directed into and through the open sinuses. The ends of the tubing 152 and 154 that attach to the supply tubing and exhaust tubing respectively, may be open-ended, as shown or utilize any industrial-standard catheter-connection device.

Also, it is understood that the phrase "predetermined duration" for the heat exchange between the heat exchange medium and the sphenoid sinuses includes the duration of treatment carried out until the subject no longer shows a particular symptom. The phrases "predetermined duration" and "predetermined end point" are interchangeably used.

Figure 14:
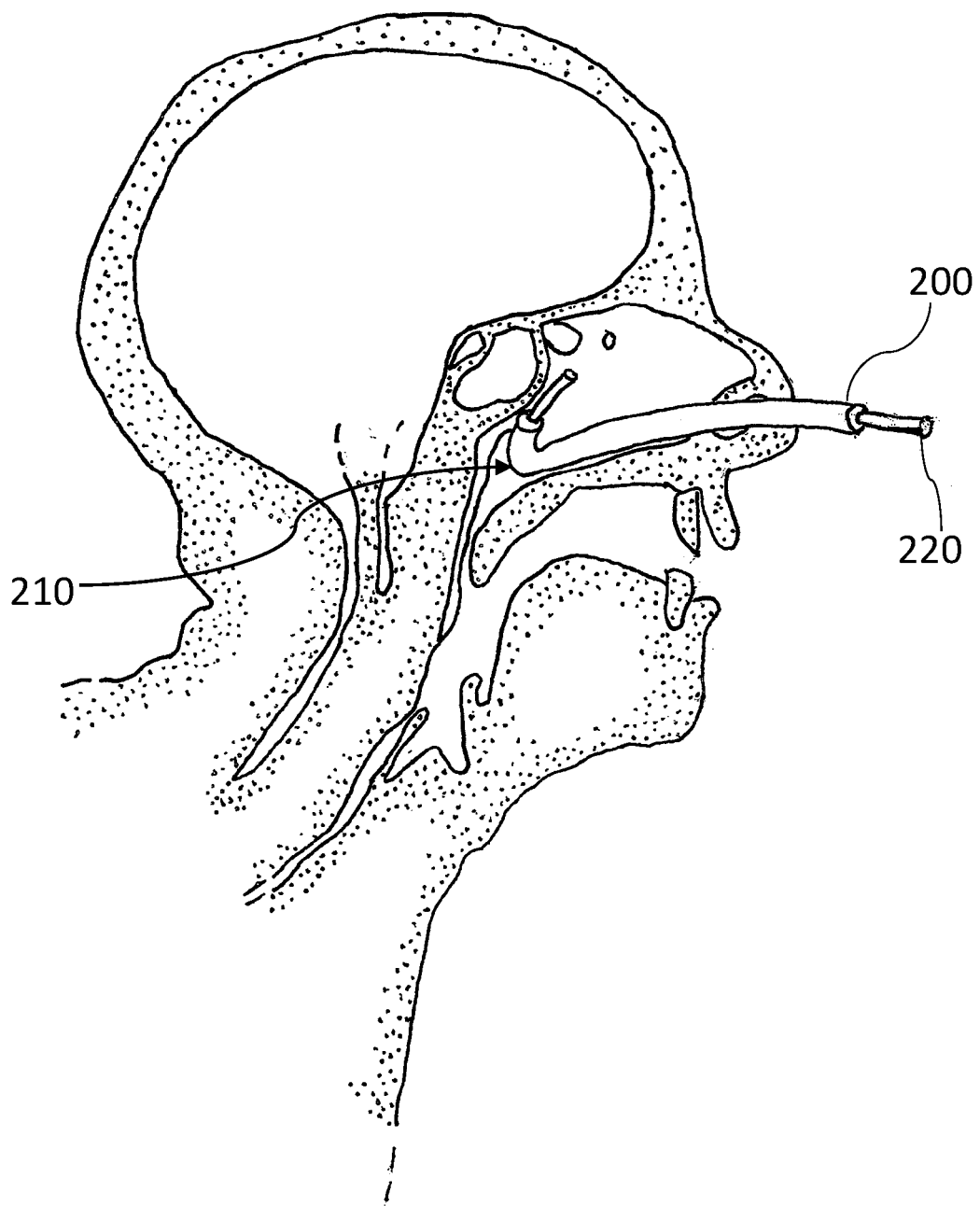
FIG. 14 is a cross-section of a human head that shows a catheter inserted through the nasal passage and to the nasal sinuses for injecting the temperature-controlled substance, according to an exemplary embodiment of the present invention.

In one embodiment, disclosed are an apparatus and method for manipulating the endocrine body temperature set point in a human or a warm-blooded animal. Particularly, disclosed are an apparatus and method for to changing the temperature of the pituitary gland in order to have an endocrine response. Disclosed is a hollow guide tube of an elongated tubular profile. The guide tube includes a proximal end and a distal end, wherein the proximal end can be a leading end while the distal end can be the trailing end. The proximal end of the guide tube can be inserted into the nasal cavity through one of the two nostrils, following the same directional path as feeding tubes commonly used in medical applications; however, the guide tube may terminate within the inner nasal cavity. Referring to FIG. 14, which is a cross section view of a human head showing the guide tube 200 inserted into the nasal cavity. The proximal end portion 210 of the guide tube is pre-formed to have a directional bend (or "elbow") which when positioned will create a directional alignment of the proximal end of the hollow guide tube toward the opening to the sphenoid sinuses. Through the guide tube 200 can be inserted a smaller-diameter flexible catheter 220, wherein the catheter passes through the guide tube and further onto the sinuses. The guide tube, and in particular, the directionally bent proximal end of the guide tube can be used to position the proximal leading end of the catheter over the opening to the sphenoid sinuses. The leading end of the flexible catheter can conform to the bend in the guide tube by deflecting thereby changing direction of advancement from the direction of insertion toward the direction of the opening of the sphenoid sinuses. The guide tube can provide direction and support for the catheter, and adjustments to the direction of the inserted flexible catheter may be made by simply rotating the exposed distal end of the guide tube.

A heat exchange medium can be applied to the sphenoid sinuses through the catheter. The heat exchange medium can be at a predetermined temperature, wherein heat can be exchanged between the heating medium in the catheter and the sphenoid sinuses. The heat exchange can be continued for a predetermined duration, such as to manipulate the temperature of a pituitary gland without manipulating the temperature of the hypothalamus.

The disclosed apparatus and method can also provide for detecting an endocrine metabolic response, such as a change in a body temperature of the subject or related infectious-disease symptoms in reaction to the application of the heat exchange medium.

The predetermined temperature of the heat exchange medium can be lower than the temperature of the sphenoid sinuses resulting in a decrease in the temperature of the pituitary gland. In other aspects, the predetermined temperature of the heat exchange medium can be higher than a current temperature of the sphenoid sinuses resulting in an increase in the temperature of the pituitary gland. The predetermined duration can vary case to case and can be determined. For example, the predetermined duration can be about a minute, hour, or days, and may be continuous or periodic as required.

In certain implementations, the decrease in the temperature of the pituitary gland results in an acute metabolic response, such as a lowering of the body temperature in a fever. Also, the sustained decrease in the temperature of the pituitary gland results in a metabolic response, such as a lowering of the body temperature in a fever that has lasted longer than 4 days. The sustained decrease in the temperature of the pituitary gland results in lowering of the body temperature from a normal body temperature level inducing therapeutic hypothermia.

In certain implementations, disclosed are a system and method for manipulating an endocrine body temperature set-point in a human or a warm-blooded animal. The disclosed method includes applying a heat exchange medium, at a predetermined temperature selectively to sphenoid sinuses of a subject for a predetermined duration to manipulate a temperature of a pituitary gland without manipulating the temperature of the hypothalamus, and detecting an endocrine metabolic response, such as a change in a body temperature of the subject or related infectious disease symptoms in response to the application of the heat exchange medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for manipulating an endocrine body temperature set-point in a human or a warm-blooded animal, the method comprises:
   providing a guide tube, the guide tube is of a hollow tubular profile, the guide tube has a proximal end and a distal end, a proximal end portion of the guide tube is pre-formed to have a directional bend;
   inserting the guide tube at the proximal end, through a nostril into a nasal cavity in proximity to sphenoid sinuses of a subject;
   upon inserting the guide tube, inserting a catheter through the guide tube, wherein a leading end of the catheter is positioned over the sphenoid sinuses, wherein the directional bend of the guide tube is configured to direct the leading end of the catheter over the sphenoid sinuses;
   applying a heat exchange medium, through the catheter, at a predetermined temperature selectively to the sphenoid sinuses for a predetermined duration to manipulate a temperature of a pituitary gland without manipulating a temperature of a hypothalamus; and
   detecting an endocrine metabolic response in response to the application of the heat exchange medium.

2. The method according to claim 1, wherein the endocrine metabolic response comprises a change in a body temperature of the subject.

3. The method according to claim 1, wherein the predetermined temperature is lower than a temperature of the sphenoid sinuses resulting in a decrease in the temperature of the pituitary gland.

4. The method according to claim 1, wherein the predetermined temperature is higher than a temperature of the sphenoid sinuses resulting in an increase in the temperature of the pituitary gland.

5. The method according to claim 3, wherein the predetermined duration is about a minute, wherein the decrease in the temperature of the pituitary gland results in lowering of the body temperature in fever.

6. The method according to claim 3, wherein the predetermined duration is about 12-24 hours, and wherein the decrease in the temperature of the pituitary gland results in lowering of the body temperature in fever that has lasted longer than 4 days.

7. The method according to claim 3, wherein the predetermined duration is about 12-24 hours, wherein the decrease in the temperature of the pituitary gland results in lowering of the body temperature from a normal body temperature level inducing a therapeutic hypothermia.

8. The method according to claim 1, wherein the heat exchange medium is liquid.

9. The method according to claim 1, wherein the heat exchange medium is gas.

* * * * *